United States Patent [19]

Ryan

[11] 4,402,231

[45] Sep. 6, 1983

[54] AGC AMPLIFIER FOR ULTRASONIC MEASURING SYSTEM

[75] Inventor: Matthew C. Ryan, Lansdale, Pa.

[73] Assignee: Fischer & Porter Company, Warminster, Pa.

[21] Appl. No.: 252,347

[22] Filed: Apr. 9, 1981

[51] Int. Cl.³ .................................................. G01F 1/66
[52] U.S. Cl. .................................... 73/861.27; 73/900
[58] Field of Search .................... 73/861.27–861.31, 73/597, 598, 631, 900

[56] References Cited

U.S. PATENT DOCUMENTS

| | | | |
|---|---|---|---|
| 2,949,772 | 8/1960 | Kritz | 73/861.27 |
| 3,090,224 | 5/1963 | Rankin | 73/900 X |
| 3,710,621 | 1/1973 | Asada | 73/861.28 |
| 4,183,244 | 1/1980 | Kohno et al. | 73/861.28 |

Primary Examiner—Charles A. Ruehl
Attorney, Agent, or Firm—Michael Ebert

[57] ABSTRACT

An ultrasonic flow rate measuring system in which a pulse of ultrasonic energy is emitted by a transducer placed on a pipe conducting the fluid to be metered, the energy being propagated through the fluid and being picked up by a second transducer at a different pipe position. The received signal burst includes a first pulsatory swing whose amplitude differs from subsequent swings, the signal burst being applied to the input of an amplifier having automatic-gain control. A clamp circuit coupled to the amplifier input is rendered operative immediately after the first swing is yielded in the amplifier output, the clamp acting to ground the input whereby the operative control level and the resultant gain of the amplifier is determined solely by the first swing.

7 Claims, 3 Drawing Figures

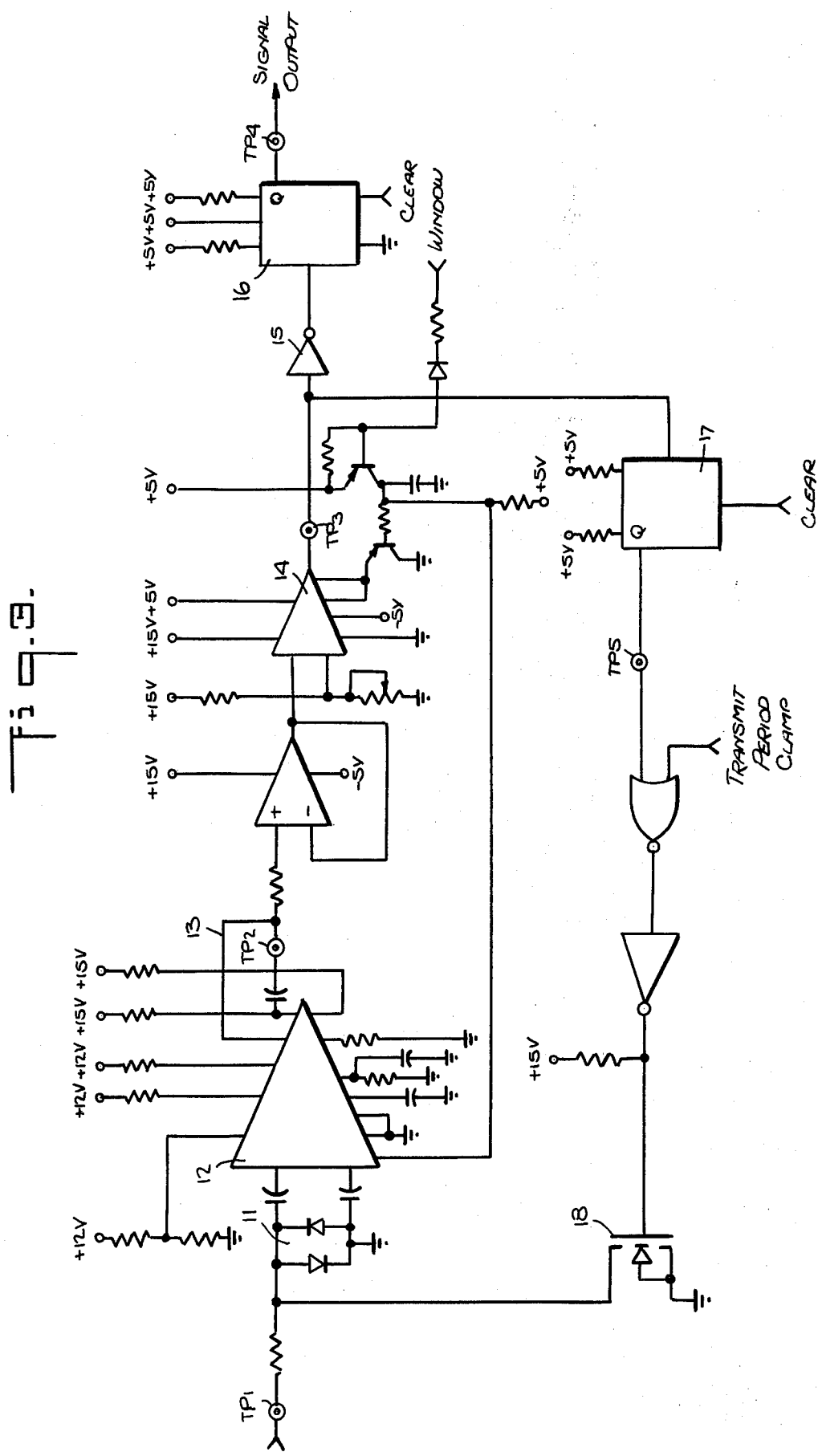

AGC AMPLIFIER FOR ULTRASONIC MEASURING SYSTEM

BACKGROUND OF INVENTION

This invention is related generally to ultrasonic systems for measuring the flow of liquid through a pipe, and in particular to a system whose receiving stage includes an automatic gain-controlled amplifier responsive only to the first pulsatory swing in the received signal burst.

The use of ultrasonic techniques to determine the flow rate or other characteristics of a liquid flowing through a pipe is well known. Among the patents disclosing systems of this type are U.S. Pat. Nos. 4,103,551; 4,004,461 and 3,906,791. Typically, in an ultrasonic system adapted to measure flow rate, a pulse of ultrasonic energy is alternately emitted by a pair of transducers, one transducer being placed upstream on the pipe at one end of a tilted diameter or diagonal, the other being placed downstream at the other end of the diagonal. The direction of tilt lies in the direction of flow.

A pulse of ultrasonic energy emitted by one transducer and propagated through the fluid being metered is detected by the other transducer. The time delay difference (that is, the upstream time minus the downstream time) between the generation of the emitted pulses and their reception is a function of flow velocity, and therefore may be converted into a flow rate reading.

When a strong pulse of ultrasonic energy is transmitted through a pipe wall and then through the fluid carried by the pipe before being picked up by a transducer, the received signal burst has a relatively low amplitude. The received signal must, therefore, be amplified to a level sufficient to operate a comparator to produce pulses whose time position reflects the transit time through the fluid. Conventionally, the amplifier for this purpose is either one having manual gain control means or an automatic gain control circuit.

The disadvantage of a manually-operated gain control is that while it may be set to afford the proper degree of gain, this setting does not take into account subsequent changes in received signal strength which normally occur over a period of time in an ultrasonic measuring system installation.

To avoid the need to make manual adjustment in amplifier gain from time to time, one may use a standard automatic gain control (AGC) arrangement to maintain the proper level of gain. An AGC amplifier is one whose gain is automatically regulated so that its output signal remains at a desired level despite variations in the strength of the signal.

It is, therefore, the usual practice in an ultrasonic measuring system to make use of an AGC amplifier to provide a degree of tolerance with respect to the many variations normally encountered in the content of the received ultrasonic signal burst. An AGC amplifier is normally responsive to the strongest pulsatory swing in the received signal burst to establish the operative AGC level.

In the received ultrasonic signal burst, the first swing is generally smaller than the second and is often of lesser amplitude than the third, fourth and fifth signal swing in the signal burst. But whichever subsequent swing has the greatest amplitude, this acts to govern the operative AGC level. Because of variations encountered in the overall strength of the received signal burst, in the number of swings included in the burst and the shape of the burst envelope, the response of the AGC circuit will inevitably be jumpy. This condition gives rise to erratic operation of the gain-controlled amplifier and may produce a considerable measurement error.

Another factor which comes into play in some ultrasonic flow rate measuring systems occurs when upstream and downstream transducer roles are interchanged, causing the frequency of the received signal burst to undergo a step which is experienced as a difference in the period of time between the first and second swing in the signal burst. The time error resulting from this effect can best be minimized if the ACG amplifier is responsive only to the first signal swing.

SUMMARY OF INVENTION

In view of the foregoing, the main object of this invention is to provide in an ultrasonic measuring system a receiving stage having an automatic gain controlled amplifier whose operative gain is determined solely by the first swing in the received signal burst, subsequent swings having no effect on the gain.

More particularly, it is an object of this invention to provide a first pulse-only AGC amplifier arrangement which includes a clamping circuit that is rendered operative just after the first swing in the signal burst appears in the amplifier output, the activated clamp serving to ground the input whereby the resultant gain of the amplifier is determined solely by the first swing.

Also an object of this invention is to provide a system of the above type which operates reliably and efficiently to afford accurate flow rate measurements despite fluctuations in the received signal burst.

Briefly stated, these objects are attained in an ultrasonic flow rate measuring system whose receiving stage includes an AGC amplifier to the input of which is applied the received signal bursts, each burst having a low lvel noise component and a higher level signal component constituted by a first pulsatory swing and a series of subsequent swings.

Connected to the input of the amplifier is a normally-disabled clamp circut which when activated functions to ground the input. Means are provided including a level comparator coupled to the output of the amplifier and set at a level which renders the comparator insensitive to the noise component, to produce a voltage for activating the clamp circuit at a point in time following the first swing in the signal burst and preceding the second swing whereby the controlled gain of the amplifier is determined entirely by the first swing. Consequently, the output signal which is derived from the amplifier output and is coincident with the first swing affords an accurate index to the flow rate of the fluid being metered.

OUTLINE OF DRAWINGS

For a better understanding of the invention as well as other objects and further features thereof, reference is made to the following detailed description to be read in conjunction with the accompanying drawings, wherein:

FIG. 3 is a schematic circuit diagram of the AGC amplifier arrangement shown in FIG. 1.

DESCRIPTION OF INVENTION

Figure 1:
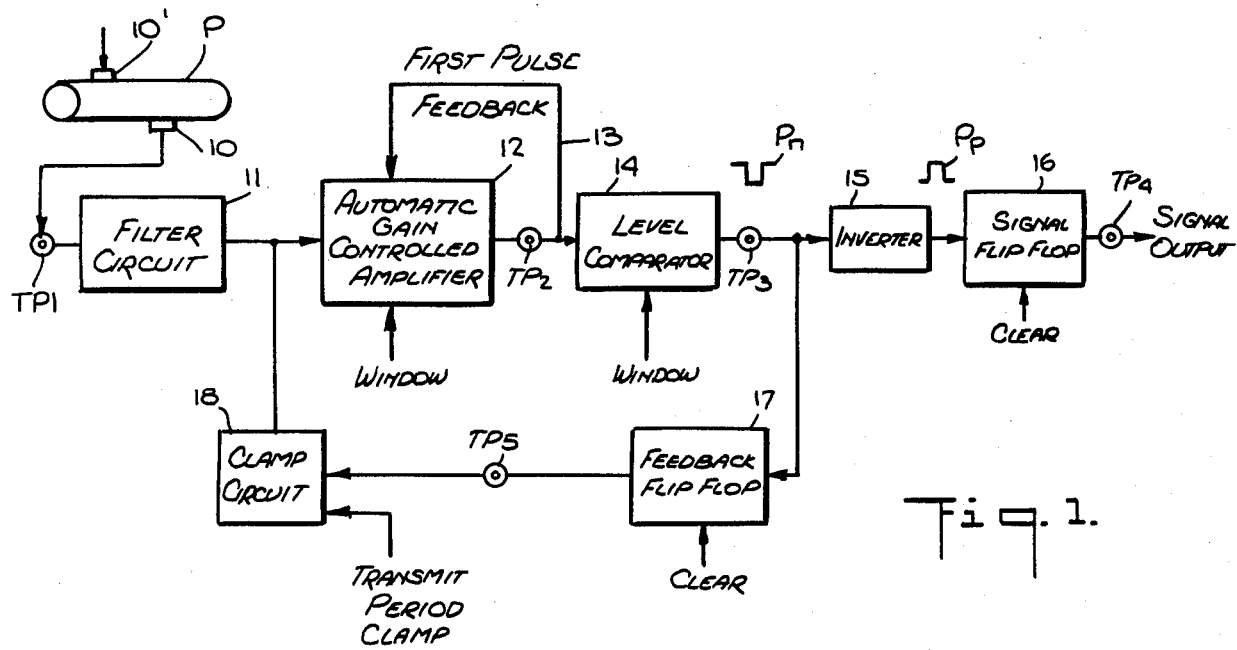
FIG. 1 is a block diagram of the receiving stage of an ultrasonic flow measuring system which includes an AGC amplifier arrangement in accordance with the invention.

Referring now to FIGS. 1 and 3, there is shown the receiving stage of an ultrasonic flow rate measuring system having a transducer 10 which picks up ultrasonic energy emitted by a second transducer 10' and propagated through a pipe P conducting the fluid to be metered; the received signal burst having relatively low strength. The output of transducer 10 is fed through a filter 11 to the input of an ACG amplifier 12, the filter serving to attenuate frequencies below the range of the received signal burst.

Figure 2:
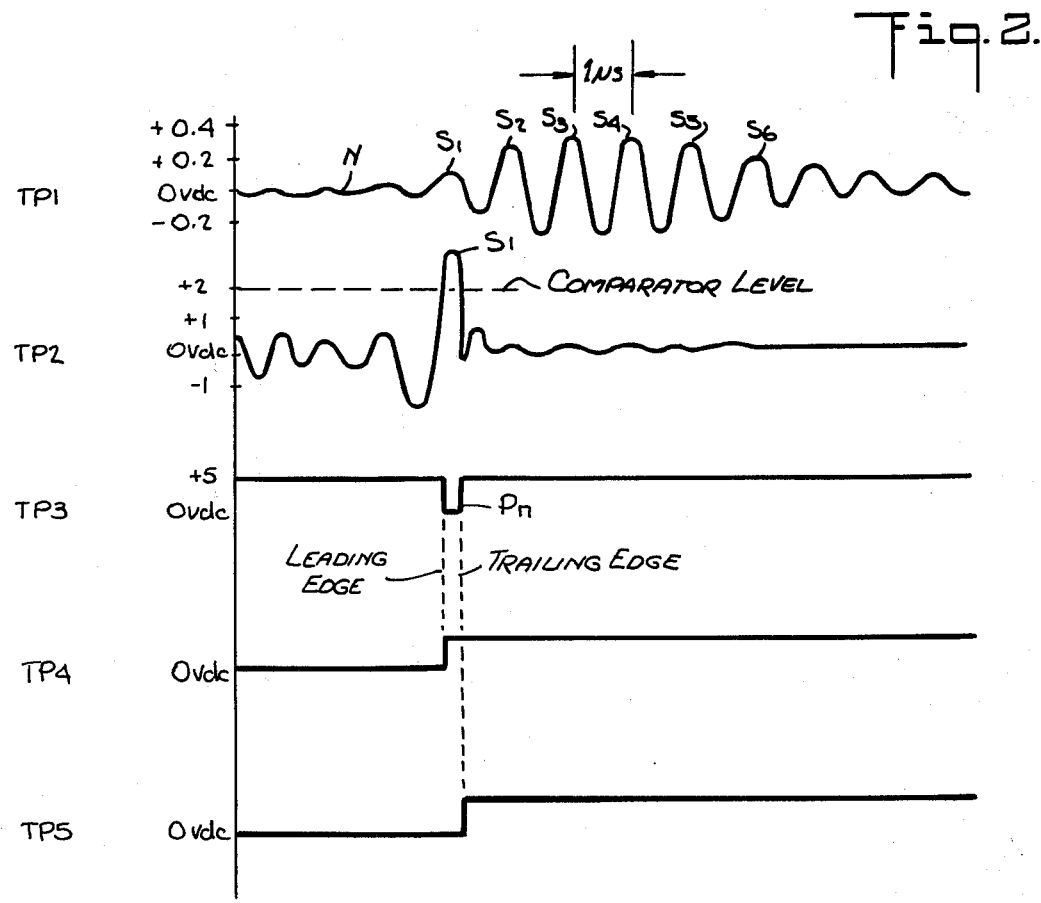
FIG. 2 shows the waveforms established at five test points in the receiving stage.

Test point $TP_1$ at the output of transducer 10 yields a signal burst whose typical waveform is shown in FIG. 2 on the $TP_1$ line. It will be seen that this burst is composed of a first positive swing $S_1$ followed by subsequent pulsatory swings $S_2$, $S_3$, $S_4$ and so on. The received signal burst is about 1 mHz. It will also be seen that the amplitude of the second swing $S_2$ and the third swing $S_3$ are greater than that of first swing $S_1$, and that subsequent swings are of progressively diminishing amplitude. The signal burst includes a noise component N whose amplitude is below that of the swings.

An arrangement in accordance with the invention provides an AGC amplifier arrangement in which the gain is controlled solely as a function of the amplitude of the first swing in the signal burst and is independent of subsequent swings and of the noise component.

The output of amplifier 12 is fed back through line 13 to the AGC biasing circuit of the amplifier to control the level which determines the operative gain. The amplifier output is also applied to the input of a level comparator 14. A test point $TP_2$ is provided at the input of comparator 14 and a test point $TP_3$ at the output thereof.

When the received burst derived from transducer 10 enters the input of amplifier 12, the amplifier is operating at its maximum gain and the noise component as well as the signal component in the burst are both amplified at full gain. However, the level of threshold comparator 14 is set above the noise component so that the comparator is responsive only to the signal component, as shown in line $TP_2$ in FIG. 2.

Though line $TP_2$ in FIG. 2 shows a residual wave formation beyond the first positive swing $S_1$, as will later be explained, the input to amplifier 12 is clamped to ground immediately following the first positive swing, and the voltage at $TP_2$ is therefore quickly brought to zero level. Since this clamping action, while extremely fast, takes a finite amount of time to reach ground, the residual wave formation which leads into a zero voltage level is intended to illustrate this transition.

The output of comparator 14 appears at test point $TP_3$ and is shown in the $TP_3$ line in FIG. 2. It takes the form of a negative-going pulse $P_n$. This is applied to an inverter 15 which yields a positive-going pulse $P_p$. Pulse $P_p$ is applied to a signal flip-flop 16. Flip-flop 16 responds to the leading edge of the positive pulse $P_p$ applied thereto to yield a signal output, this appearing at test point $TP_4$, as shown in line $TP_4$ in FIG. 2.

The trailing edge of pulse $P_n$ is applied to a feedback flip-flop 17 whose output appears at test point $TP_5$. As shown in line $TP_5$ in FIG. 2, the trailing edge of comparator pulse $P_n$ causes a positive state change to appear at the output of flip-flop 17.

The output of feedback flip-flop 17 is applied to a clamp circuit 18 connected between the input to AGC amplifier 12 and ground. When the output flip-flop 17 goes positive, this renders clamp 18 conductive to thereby ground the input to the amplifier and cut off any further input thereto.

Since the point at which the output of flip-flop 17 goes positive coincides with the trailing edge of pulse $P_n$, which edge marks the conclusion of swing $S_1$ in the received signal burst, the subsequent swings are not permitted to enter the amplifier.

Thus only the first swing $S_1$ is amplified by AGC amplifier 12 and the AGC bias level is established exclusively as a function of the amplified value of the first swing. The amplitude of the first swing at the input of the amplifier therefore controls the gain thereof. This provides effective compensation for variations in the amplitude of the first swing in the received signal burst and produces a uniform signal in the output of the amplifier which is applied to the level comparator 14.

The signal output of the signal flip-flop 16 represents only the first swing in the received signal burst and is coincident therewith. Consequently erratic operation of the receiving stage is avoided regardless of changes in the amplitude of the first swing.

The completion of an operating cycle occurs when signal flip-flop 16 and feedback flip-flop 17 are cleared by appropriate clearance signals applied to these devices. A "window" signal is applied to amplifier 12 and comparator 14 to render these devices operative only during the receiving intervals of the system, the window signals and the clearance signals being derived from the transmitter stage of the system.

While there has been shown and described a preferred embodiment of AGC Amplifier for Ultrasonic Measuring System in accordance with the invention, it will be appreciated that many changes and modifications may be made therein without, however, departing from the essential spirit thereof.

I claim:

1. In an ultrasonic system for measuring the flow rate of a fluid conducted through a pipe, the system being provided with a transducer to emit a pulse of ultrasonic energy which is propagated through the fluid and is received by a second transducer at a different position, the received signal burst having a low level noise component and a higher level signal component constituted by a first pulsatory swing and a series of subsequent swings; a receiving stage responsive to said signal burst to produce an output signal whose time position depends on the flow rate of the fluid, said stage comprising:
   A. an automatic gain control amplifier having an input to which said signal burst is applied;
   B. a normally-disabled voltage-responsive clamp circuit connected to the input of the amplifier; said clamp circuit, when activated, functioning to ground said input;
   C. means coupled to the output of the amplifier to produce a voltage for activating the clamp circuit at a point in time following the first swing and preceding the second swing in the signal burst, whereby the controlled gain of the amplifier is determined entirely by the first swing; and
   D. means to derive an output signal from the output of the amplifier, which is coincident with the first swing.

2. A stage, as set forth in claim 1, wherein said amplifier includes a feedback path between the output thereof and the input to its gain control circuit whereby said first swing is applied thereto.

3. A stage, as set forth in claim 1, further including a filter in advance of said amplifier input.

4. A stage, as set forth in claim 1, wherein the means coupled to the output of the amplifier includes a level comparator, the level thereof being set to exclude the noise component in the amplified signal burst.

5. A stage, as set forth in claim 4, wherein said comparator produces a negative-going pulse in response to the first swing in the burst and coincident therewith, and said means to derive said output signal is constituted by an inverter to which said negative-going pulse is applied to yield a positive-going pulse which is applied to a signal flip-flop to yield said output signal which is coincident with the first swing.

6. A stage, as set forth in claim 5, wherein the means coupled to the output of the amplifier further includes a second flip-flop which is triggered by the trailing edge of said negative-going pulse to provide the voltage for activating said clamp circuit.

7. A stage, as set forth in claim 6, further including means to clear the signal flip-flop and the second flip-flop at the end of each operating cycle.

* * * * *